United States Patent Office 2,821,542
Patented Jan. 28, 1958

2,821,542

PREPARATION OF HYDROXYALKYL CARBOXYLATES

Alfred F. Schmutzler, Stamford, Conn.

No Drawing. Application February 6, 1953
Serial No. 335,583

14 Claims. (Cl. 260—475)

This invention relates to the preparation of hydroxyalkyl carboxylates, which, as shown in my Patent No. 2,692,164, are useful in insect repellent compositions.

This application is a continuation-in-part of my application Serial Number 729,671, filed February 19, 1947, now abandoned.

The preparation of hydroxyalkyl carboxylates from glycols and dibasic acids involves the risk of resin formation. In the prior art, this difficulty was realized when ethylene glycol was reacted with succinic acid. The resulting ester, after boiling off excess glycol, contained a large portion of the polyester.

This polyester or resin formation, it has been found, can be greatly reduced, if a moderate excess, as about 25% to 300% excess of glycol is reacted with a dibasic organic acid in the presence of a large amount of solvent. It is possible that a very large excess of glycol, as for example more than 300% excess, will also reduce polyester formation. However, it is one of the objects of this invention to prepare these esters economically with but a moderate excess of glycol, in the presence of a water-immiscible inert solvent so that the liberated water can be removed as soon as it is formed and does not retard the esterification.

The inert solvent apparently acts as a diluent and favors the orientation of an unreacted glycol toward a free carboxyl group, while the glycol, which has one hydroxyl group esterified, has the other hindered in its orientation due to its weaker reactivity. Though this explanation has not been fully investigated and remains an assumption, the incontrovertable fact remains that the inert solvent in the esterification is advantageous in the accomplishment of the objects of this invention.

This invention has the object of providing for practical methods of preparation of hydroxyalkyl polycarboxylates, which have been found suitable in the improved insect repellent compositions, as described in my copending application Serial Number 223,443, filed April 27, 1951.

Thus it is the object of this invention to provide an advantageous procedure for the preparation of the following hydroxyalkyl carboxylates:

(1) Mono (hydroxyalkyl) polycarboxylates,
(2) Poly (hydroxyalkyl) polycarboxylates,
(3) Alkyl mono(hydroxyalkyl) polycarboxylates,
(4) Alkyl poly(hydroxyalkyl) polycarboxylates,
(5) Hydroxyalkyl carbamylcarboxylates,
(6) Poly(hydroxyalkyl) carbamylcarboxylates,
(7) Alkyl hydroxyalkyl carbamylcarboxylates,
(8) Hydroxyalkyl iminoacylcarboxylates,
(9) Alkyl hydroxyalkyl iminoacylcarboxylates.

It is a further object of this invention to reduce side reactions to an economically practical minimum in the preparation of these hydroxyalkyl esters.

It is a further object of this invention to substantially reduce or completely eliminate polyester or resin formation in the preparation of these esters.

Other objects will be apparent from the detailed description of the invention herein.

To accomplish the objects of this invention preparation of these hydroxyalkyl esters is carried out in the presence of large volumes of inert solvents at temperatures below 160° C. and particularly in the preferred ranges of 70 to 140° C.

It has been found that these objects can be accomplished in the presence of a moderate excess of polyhydric alcohol and temperatures between from about 40° C. to 160° C. In order to keep temperatures sufficiently low, it has been found that a large volume of inert liquid with a boiling range less than about 140° C. fixes the temperature of esterification below 160° C. and prevents substantial side reactions, especially formation of polyesters which are resinous bodies commonly called alkyd resins.

In carrying out the reaction, one may choose any solvent with a boiling range preferably above 40° C. Those solvents include saturated and unsaturated hydrocarbons, aromatic hydrocarbons, ethers, and ketones; however, the preferred solvents are hexane, heptane, octane, benzene, toluene, xylene, cycloheptane, cyclohexane, methylcyclohexane, and mineral spirits. In addition, halogenated derivatives of these solvents, such as chlorbenzene, fluorobenzene, fluorotoluene, fluoroxylene, dichlorethyl ether or the like, can be used if the resulting ester is contemplated for use for insect repellent compositions which do not come in contact with the human skin or domesticated animals. Such uses comprise the spraying of insect and rodent repellents into inaccessible places which can serve as nesting and breeding places for insects, rodents or other undesirable wild animals. For those purposes, it is advantageous to retain the mixture of ester and solvent for the compounding of the repellents.

The volume of inert liquid should be more than about 40% of the charge to be operative and less than about 80% to be economical.

The esterification is preferably conducted in the presence of an esterification catalyst, such as sulfuric acid, sodium acid sulfate, sodium sulfate, calcium sulfate, ammonium sulfate, ammonium chloride, ammonium oxalate, calcium oxalate, calcium acetate, or the like. Some acids, such as oxalic acid, diglycolic acid or the like require no catalyst, as their rate of esterification is very rapid; yet, a catalyst has some advantages toward the end when more than 75% of the carboxyl groups have been esterified. For these acids, it is preferred to use a solid catalyst which is insoluble in the resulting ester so that the salt can be separated from the ester by filtration instead of washing with water.

After the completion of the esterification process, it is advantageous to neutralize any remaining acid, preferably with a mildly alkaline compound like sodium bicarbonate, calcium carbonate or the like by slurrying the powdery solid in the reaction mixture, then filtering off the solid or separating the water layer, and then removing the inert solvent and excess glycol by vacuum distillation to prevent further esterification, which would lead to the formation of an undesirably large proportion of polyester, usually referred to as alkyd resin. An alternate method of purification consists of washing out the water-soluble impurities with a mildly alkaline solution, separating the water layer and then subjecting the ester to vacuum distillation. A final filtration with some filter aid would remove all solid impurities. This alternate method is suitable for esters which do not readily hydrolyze.

The method of preparation of the hydroxyalkyl polycarboxylates will be described in the following examples, in which the parts are by weight.

*Example 1*

450 parts of 2-ethylhexanediol-1,3, 148 parts of phthalic anhydride, 600 parts of toluol, and 3 parts of 98% sulfuric acid are mixed by stirring in a suitable reaction vessel provided with thermometers, stirrer, condenser and water-separating device in line with condenser. After thorough mixing, stirring is continued mostly throughout the entire preparation and purifying procedures. The reaction mixture is boiled so that a moderate rate of distillation of the inert solvent removes the liberated water from the reaction zone and delivers it to the separating device, from where the inert solvent is permitted to return to the reaction zone. After removal of a substantial amount of water, preferably almost the theoretical amount, which is collected within 24 hours during the azeotropic distillation, the charge is cooled to 60° C. or lower and mixed for about ½ hour with a solution of 40 parts of sodium bicarbonate in 1000 parts of water. Should the water layer become neutral or acid, small increments of sodium bicarbonate will have to be added before separating the water layer from the water-insoluble layer, which afterward should be washed with water to remove traces of alkali and then subjected to distillation. This distillation should be done below 90° C. and may be started at normal atmospheric pressure but should be finished under vacuum, with the absolute pressure corresponding to less than 20 mm. of mercury. If during the removal of the excess glycol the temperature is kept low, further esterification will be negligible; otherwise, substantial proportions of alkyd resins will form. Since during the washing operation, most of the excess glycol has been removed, the ester is substantially pure after the removal of the inert solvent, traces of which can finally be removed by a stream of inert gas, such as carbon dioxide, nitrogen or the like. After removal of the solvent, the dry ester may be mixed with a small portion, such as about ½ % of the weight of the ester, of filter-cel and filtered.

This purified ester is suitable for mixtures with diluents and for mixtures with other effective, but volatile insect repellents for the compounding of long lasting insect repellent compositions, which can safely be applied to the human skin or to domesticated animals. Should it be desired to compound this type of ester with the glycol used in the preparation, the elimination of unreacted acid can be accomplished by adding sodium bicarbonate or calcium carbonate or a similar mildly alkaline compound instead of the water solution of sodium bicarbonate, stirring the mixture until samples of the reaction mixture indicate the absence of free acid. Then the removal of inert solvent can be accomplished by distillation at slightly higher temperatures after the removal of all alkaline compounds.

Furthermore, should this ester be used for insect repellent compositions which do not come in contact with men or domesticated animals, the solvent and the free acid other than sulfuric acid, may be retained in the reaction mixture, especially when the inert solvent is a halogenated hydrocarbon or ether which add to the insect repellent and also rodent repellent properties of such mixtures. Since, however, the sulfuric acid should preferably be removed from such reaction mixtures, it is more advantageous to use no esterifying catalyst or a solid salt, such as sodium sulfate or the like, which can be removed from the mixture by settling or filtration.

In this example, the ratio of glycol to dibasic acid is 3:1 on a molar basis. It is the preferred ratio for all dicarboxylates. However, with the glycols which have one primary hydroxyl group and a secondary and a tertiary hydroxyl group, the ratio may be as low as 2.5:1 without substantial alkyd resin formation. With those glycols which have two primary hydroxyl groups, the 3:1 molar ratio is preferred; yet, it will not be uneconomical to have a ratio of about 4.5:1, especially when the glycol in the reaction mixture need not be separated but remains in the ester as a component of the insect repellent composition.

These principles pertaining to Example 1 are also applicable to other poly(hydroxyalkyl) polycarboxylates, some of which will be shown in further examples.

Example 2

450 parts of 2-ethylhexanediol-1,3, 164 parts of cis-3,6-endomethylenetetrahydrophthalic anhydride, 650 parts of toluol, and 3 parts of 98% sulfuric acid are processed by the procedure of Example 1.

Example 3

500 parts of triethylene glycol, 164 parts of cis-3,6-endomethylenetetrahydrophthalic anhydride, 700 parts of chlorbenzene, and 3 parts of 98% sulfuric acid are processed by the procedure of Example 1.

Example 4

600 parts of tetraethylene glycol, 164 parts of cis-3,6-endomethylenetetrahydrophthalic anhydride, 700 parts of toluene, and 3 parts of 98% sulfuric acid are processed by the procedure of Example 1.

Example 5

450 parts of 2-ethylhexanediol-1,3, 126 parts of oxalic acid dihydrate, 700 parts of toluene, 142 parts of anhydrous sodium sulfate are processed by the procedure of Example 1, except that this ester is not washed with water but mixed with a small portion of calcium carbonate to remove unreacted acid. This change in the procedure will lead to high yields of ester, as hydrolysis of the bis(hydroxyalkyl) oxalate is substantially eliminated. The amount of water, 71.6 parts, which is liberated during the esterificaiton, indicates that essentially the bis-(hydroxyalkyl) oxalate has been formed, in spite of any assumptions which could be made from a presumable equivalent of reacting oxalic acid with an excess of glycerol. In this reaction, according to the literature, oxalic acid decomposes. However, such an assumption is not always correct, as it has been found that even a bis-(hydroxyethyl) oxylate can be made from oxalic acid in the presence of an excess of ethylene glycol.

Example 6

372 parts of ethylene glycol, 252 parts of oxalic acid dihydrate, 700 parts of benzene, and 10 parts of sodium sulfate anhydrous were subjected to esterification and azeotropic dehydration, as outlined in Example 1. The temperature of the contents in the kettle remained below 85° C. During this distillation, 164 parts of water layer, containing at least 18 parts of ethylene glycol according to specific gravity and freezing point determinations, were collected. After the distillation, the contents in the kettle had the equivalent weight of 969 parts, indicating that there was but a negligible loss of 1 part of charge, which might have been lost during the distillation by the incomplete condensation of all benzene vapors.

Excess acid was removed with one part of barium carbonate, which was added as a powder, stirred and then removed with the catalyst by filtration. Excess glycol and the inert solvent were removed by vacuum distillation, during which the temperature was kept below 70° C.

Example 7

126 parts of oxalic acid dihydrate, 318 parts of diethylene glycol, 500 parts of benzene, and 5 parts of anhydrous sodium sulfate were processed as described in Example 6. During the distillation, 74 parts of water layer were collected instead of the theoretical amount of 72 parts. There was no loss in the charge.

The ester was recovered as outlined in Example 6.

Example 8

450 parts of 2-ethylhexanediol-1,3, 98 parts of maleic anhydride, 700 parts of toluene, and 3 parts of 98% sulfuric acid were processed according to the procedure of Example 1.

Example 9

450 parts of 2-ethylhexanediol-1,3, 134 parts of monochlormaleic anhydride, 700 parts of toluene, and 3 parts of 98% sulfuric acid were processed by the procedure of Example 1.

Example 10

450 parts of 2-ethylhexanediol-1,3, 182 parts of cis-3,6-endothiotetrahydrophthalic anhydride, 700 parts of toluene, and 3 parts of 98% sulfuric acid were processed by the procedure of Example 1.

Example 11

450 parts of 2-ethylhexanediol-1,3, 166 parts of cis-3,6-endoxytetrahydrophthalic anhydride, 700 parts of toluene, and 142 parts of anhydrous sodium sulfate were processed according to the procedure outlined in Example 6.

Example 12

250 parts of tetraethylene glycol, 164 parts of cis-3,6-endomethylenetetrahydrophthalic anhydride were heated slowly in about one hour to 100° C. and then were stirred at this temperature for two hours, after which the charge was cooled to about room temperature, and 120 parts of dimethylamine solution of 25% strength were added, followed by 500 parts of toluene. The mixture was heated to boiling and the water was removed from the distillate until the vapor temperature reached 111° C. At this stage, no more water was present in the distillate. The charge was cooled to 60° and washed with a dilute sodium bicarbonate solution, then with water, and then the inert solvent was removed by vacuum distillation.

Example 13

250 parts of tetraethylene glycol, 164 parts of cis-3,6-endomethylenetetrahydrophthalic anhydride, 170 parts of diamyl amine, and 700 parts of toluene were processed according to the procedure of Example 12.

Example 14

250 parts of 2-ethylhexanediol-1,3, 164 parts of cis-3,6-endomethylenetetrahydrophthalic anhydride, 200 parts of di(cyclohexyl)-amine, and 700 parts of toluene were processed according to the procedure of Example 12.

Example 15

250 parts of 2-ethylhexanediol-1,3, 164 parts of cis-3,6-endomethylenetetrahydrophthalic anhydride were heated slowly to 100° C., and the charge was stirred for two hours at 100–110° C., then cooled to about 70° C., when 1000 parts of anhydrous methanol and 10 parts of 98% sulfuric acid were slowly added. This charge was boiled for 16 hours. Then, the bulk of excess methanol was boiled off until the temperature in the kettle reached 90° C. The charge then was neutralized with 20 parts of sodium bicarbonate, and the distillation of the methanol was continued until the temperature reached 90° again. The remaining ester was cooled and washed with water until neutral, and then, it was purified by vacuum distillation and filtration. The resulting ester was very viscous and had a vapor pressure of less than 0.01 mm. Hg at 25° C.

Example 16

250 parts of 2-ethylhexanediol-1,3, 164 parts of cis-3,6-endomethylenetetrahydrophthalic anhydride, 1000 parts of isopropanol, 10 parts of sulfuric acid 98%, and 300 parts of benzene were processed as outlined for Example 15.

Example 17

268 parts of tetramethyl ethylenetetracarboxylate, 400 parts of propylene glycol, 2 parts of calcium hydroxide, and 500 parts of toluene are kept gently boiling for 2 hours, and then, by means of a fractionating column, methyl alcohol is distilled off until 128 parts have been collected. Distillation is afterward continued by bypassing the fractionating column to distil off toluene and a substantial portion of the excess propylene glycol. The last traces of toluene are removed by the application of vacuum and flushing out the vapors by an inert gas. The resulting ester can be used after filtering or it can be purified by washing with water and then filtering and dehydrating with either anhydrous sulfate or with some other dehydrating agent.

Example 18

The procedure of Example 17 was followed with the following reactants: 426 parts of hexamethyl mellitate 620 parts of ethylene glycol, 3 parts of calcium hydroxide, and 200 parts of toluene. During the ester interchange, 192 parts of methanol were collected.

Example 19

With the charge of Example 17, the distillation was discontinued after 64 parts of methanol had been collected. The recovered ester is essentially dimethyl bis(2-hydroxypropyl) ethylenetetracarboxylate.

Example 20

With the charge of Example 17, the distillation was discontinued after 96 parts of methanol had been collected. The recovered ester is essentially methyl tris(2-hydroxypropyl) ethylenetetracarboxylate.

Example 21

174 parts of aconitic acid, 99 parts of cyclohexylamine, and 700 parts of toluene were heated under reflux conditions, during which water was removed from the condensate. When 18 parts had been collected, 380 parts of propylene glycol and 6 parts of cyclohexylammonium sulfate were added and distillation was continued until 36 parts of water were removed from the condensate. Then the contents of the kettle were washed with a dilute solution of sodium bicarbonate and then with water until the washwater was neutral. Afterwards, the water-insoluble layer was subjected to vacuum distillation to boil off toluene; the last traces were removed by bleeding in a fine current of inert gas. The remaining bottoms were filtered.

Example 22

216 parts of trimethyl aconitate, 210 parts of diethanolamine, 1 part of calcium hydroxide, and 800 parts of toluene were gently boiled and the liberated methanol was removed at the top of the distilling column. When 64 parts of methanol had been collected, 392 parts of propylene glycol were added and the azeotropic distillation was continued until an additional 32 parts of methanol were collected. Then the contents of the vessel were washed with copious portions of a 20% sodium chloride solution. When the washwater remained neutral after five or six washings, toluene and traces of water were removed by vacuum distillation, and remaining inorganic salt was removed by subsequent filtration.

The transesterification of the methyl, ethyl or other alkyl esters of the polycarboxylic acids, including the dibasic acids, is a convenient method of preparing the polyhydroxyalkyl polycarboxylates and the alkyl hydroxyalkyl polycarboxylates. It requires less of an excess of glycol than direct esterification of the polycarboxylic acids with the glycols. It is conveniently applied when the polycarboxylic acid is considerably more expensive than the glycols and alkylols. However, usually the direct esterification with the glycols is more flexible, as shown by subsequent examples.

Example 23

1350 parts of butanediol-1,3, 342 parts of mellitic acid, 1600 parts toluene, and 10 parts of 98% sulfuric acid were processed according to the procedure of Example 1.

The resulting ester was very viscous. It was more effective as an insect repellent than bis(2-ethyl-3-hydroxyhexyl) phthalate.

Example 24

540 parts of butanediol-1,3, 218 parts of 1,2,3-butanetricarboxylic acid, 800 parts of benzene, and 5 parts of 98% sulfuric acid were processed according to the procedure of Example 1. The resulting ester was very viscous though less viscous than hexa(2-hydroxybutyl) mellitate.

Example 25

901 parts of butanediol-1,3, 254 parts of pyromellitic acid (a benzenetetracarboxylic acid), 6 parts of 98% sulfuric acid, and 1000 parts of benzene were processed according to the procedure of Example 1. The resulting ester was more viscous than tris(2-hydroxybutyl) camphoronate, as shown in Example 24, but less viscous than hexa(2-hydroxybutyl) mellitate.

Example 26

254 parts of pyromellitic acid, 99 parts of cyclohexylamine, and 700 parts of toluene were boiled until 18 parts of water had been collected. Then 540 parts of butanediol and 10 parts of tetramethylammonium sulfate were added, boiling was resumed until approximately 54 parts of water had been collected, the resulting mixture was washed with a dilute solution of sodium bicarbonate and then with water until the wash water was neutral, and then the remaining water-insoluble layer was subjected to vacuum distillation.

Example 27

254 parts of pyromellitic acid, 198 parts of cyclohexylamine, and 700 parts of toluene were boiled until 36 parts of water had been collected. Then 270 parts of butanediol-1,3 and 10 parts of tetramethylammonium sulfate were added, boiling was resumed until approximately 36 parts of water had been collected, and the resulting mixture was further processed as outlined in Example 26. The resulting ester consisted substantially of bis(3-hydroxybutyl) bis-N,N'-(cyclohexylcarbamyl)-benzenedicarboxylate.

Example 28

254 parts of pyromellitic acid, 297 parts of cyclohexylamine, and 700 parts of toluene were boiled until 54 parts of water had been collected. Then 145 parts of butanediol-1,3 and 5 parts of tetramethylammonium sulfate were added, boiling was resumed until 18 parts of water had been collected, and then the resulting mixture was further processed as outlined in Example 26. The resulting ester consisted essentially of 3-hydroxybutyl tris-N,N',N"-(cyclohexylcarbamyl)benzoate.

Example 29

342 parts of mellitic acid, 99 parts of cyclohexylamine, and 1300 parts of toluene were boiled until 18 parts of water had been collected. Then 990 parts of butanediol-1,3 and 20 parts of tetramethylammonium sulfate were added, boiling was resumed until approximately 90 parts of water had been collected, and then the resulting mixture was further processed as outlined in Example 26. The resulting ester consisted substantially of penta(3-hydroxybutyl) carbamylbenzenepentacarboxylate.

Example 30

342 parts of mellitic acid, 198 parts of cyclohexylamine, and 1300 parts of toluene were boiled until 36 parts of water had been collected. Then 720 parts of butanediol-1,3 and 20 parts of tetramethylammonium sulfate were added, boiling was resumed until approximately 72 parts of water had been collected, and then the resulting mixture was further processed as outlined in Example 26. The resulting ester consisted substantially of tetra(3-hydroxybutyl) bis(N,N' - cyclohexylcarbamyl) - benzenetetracarboxylate.

Example 31

342 parts of mellitic acid, 297 parts of cyclohexylamine, and 1300 parts of toluene were boiled until 54 parts of water had been collected. Then 450 parts of butanediol-1,3, and 10 parts of tetramethylammonium sulfate were added, boiling was continued until approximately 54 parts of water had been collected, and then the resulting mixture was further processed as outlined in Example 26. The resulting ester consisted substantially of tris(3-hydroxybutyl) tris(N,N',N"-cyclohexylcarbamyl)benzenetricarboxylate.

Example 32

342 parts of mellitic acid, 396 parts of cyclohexylamine, and 1300 parts of toluene were boiled until 72 parts of water had been collected. Then 270 parts of butanediol-1,3, and 10 parts of tetramethylammonium sulfate were added, boiling was resumed until approximately 36 parts of water had been collected, and then the resulting mixture was further processed as outlined in Example 26. The resulting ester consisted substantially of bis(3-hydroxybutyl)tetra-(N,N',N",N"'-cyclohexylcarbamyl)phthalate.

In the preceding examples, butanediol-1,3 was demonstrated as the glycol for esterification. It can be replaced by any other glycol, such as ethylene glycol, propylene glycol, butanediol-1,2, pentanediol-1,2, pentanediol-1,3, pentanediol-1,4, pentanediol-1,5, hexanediol-1,2, hexanediol-1,3, hexanediol-1,4, hexanediol-1,5, heptanediol-1,2, heptanediol-1,3, octanediol-1,2, octanediol-1,3, nonanediol-1,2, nonanediol-1,3, or the like; or it can be replaced by a polyglycol, such as diethylene glycol, triethylene glycol, tetraethylene glycol, dipropylene glycol, tripropylene glycol. Further substitutions of the butanediol-1,3 can be made with the monoethers of glycerol, monoethers of butanetriols, monoethers of pentanetriols, or the like, or the diethers of butanetetra-ols, pentanetetra-ols or the like. Similarly, the polycarboxylic acids can be substituted by any other polycarboxylic acid, and the inert solvent toluene can be substituted by more or less volatile solvents and their percentage in the reaction mixture can be varied in some way as long as the temperature of the charge is less than 140° C. during the esterification in order to avoid excessive formation of the polyester. Further variations can be made by a substitution of the catalyst trimethylammonium sulfate and cyclohexylammonium sulfate by any other sulfate or a chloride or the like.

Example 33

1661 parts of terephthalic acid, 316 parts of urea, and 800 parts of chlortoluene (with a boiling point of 162° C.) were heated to boiling in about 5 hours. During this interval, 90 parts of water were collected. Then 2000 parts of benzol were gradually added while the heat was turned off; and then 2924 parts of 2-ethylhexanediol-1,3 and 50 parts of anhydrous sodium sulfate were added. Boiling of the mixture was resumed until 180 parts of water had collected. Thereafter, the mixture was cooled to 60° C. It was washed with a dilute sodium bicarbonate solution, then with water until the wash water was neutral. The water-insoluble layer was subjected to vacuum distillation until substantially all of the inert solvent and the excess glycol had been removed. The resulting ester was filtered with charcoal and filtercel. It consisted of 2-ethyl-3-hydroxyhexyl 4-carbamylbenzoate.

Many variations of this ester are possible by the replacement of urea with substituted ureas. Carbanilide yielded 2-ethyl-3-hydroxyhexyl 4-carbanilobenzoate. Sym.-dimethylurea yielded 2-ethyl-3-hydroxyhexyl 4-(N-methylcarbamyl)benzoate. Tetramethylurea yielded 2-ethyl-3-hydroxyhexyl 4-(N,N-dimethylcarbamyl)benzoate.

For the preparation of the N-substituted carbamylbenzoates, the symmetrically substituted ureas are preferred, as they yield substantially homogeneous esters. The unsymmetrically substituted ureas can be used if mixtures of the carbamylbenzoates are desired. However, the principle of preparation is the same for all ureas, including thioureas. Its mechanism seems to depend upon the initial formation of an addition compound, followed by subsequent decomposition, during which water and carbon dioxide from the urea complex or water and carbonyl sulfide from the thiourea complex are liberated.

Further variations are possible by the substitution of terephthalic acid by some other polycarboxylic acid. For the preparation of carbamylcarboxylates and mono-N-alkylcarbamylcarboxylates, the preferred dibasic acids have no adjacent carboxyl groups, as they have the tendency to form imino derivatives. Such hydroxyalkyl iminobenzoates are made by the procedure of Example 33 by substituting a tribasic, tetrabasic, pentabasic, hexabasic acid or the like, such as 1502 parts of hemimellitic acid, 1502 parts of trimellitic acid, 1741 parts of aconitic acid, or 1921 parts of citric acid, or the like, and then boiling off approximately 180 parts of water during the preparation of the imido derivative of the organic acid. For the preparation of di-N-alkylcarbamylcarboxylates, any dibasic acid or polybasic acid can be used with the procedure of Example 33.

In Example 33, an excess of about 5% urea was used. Such a slight excess, preferably between 5 to 15% is beneficial to the yield of the carbamyl or imino derivative of the polycarboxylic acid. Less of an excess is required with the substituted ureas and thioureas.

During the formation of the carbamyl and imido derivatives, temperatures above 100° C. are required. The preferred range for the final temperatures is from 130 to 170° C. In some instances, it might be desirable to heat the mixture as high as 225° C.

During the esterification of the carbamylbenzoic acid of Example 33, an excess of 100% glycol was used. It is the preferred excess in the preparation of carbamylcarboxylates, though good results are obtainable with as little as 40% excess, and economical esterifications can be carried out with as much as 350% excess.

2-ethylhexanediol-1,3 was found to give good results as the glycol for esterification of the carbamylcarboxylic acid. The resulting products had good insect-repellent properties. This glycol can be substituted by other glycols, such as ethylene glycol, propanediol, butanediol, pentanediol, hexanediol, heptanediol, octanediol, nonanediol, monoethers of glycerol, monoethers of butanetriol, monoethers of pentanetriol, monoethers of hexanetriol, monoethers of heptanetriol, monoethers of octanetriol, diethers of butanetetra-ols, diethers of pentanetetraols, or the like.

The novelty of the formation of the carbamylcarboxylic acid and the imidocarbonylcarboxylic acid resides in the use of solvents, which enables agitation of the reaction mixture and thus indirectly affects the particle size. Without a solvent, the preparation of these acid derivatives are much more complicated. It requires (1) the blending of the powders, (2) the fusion of the mixed powders, (3) the diminution of the resulting cake to a fine powder, (4) two leachings of the powder with different solvents to leach out impurities, (5) subsequent filtrations after each leaching, (6) drying of the filtercake, (7) powdering of the filtercake. There are inevitable losses accompanying these unit operations, with the yields appearing unusually good if they reach 80% of the polycarboxylic acid when urea is used in excess. The purity might be as high as 95% if the leachings are carried through efficiently.

The many unit operations necessary without a solvent indicate the advantages of the process outlined in Example 33, in which a high purity carbamylbenzoic acid is prepared with one single operation so that it is ready for further processing. This same procedure can be used for the preparation of carbamides and imides by merely choosing either a monocarboxylic acid if the same molar ratio of urea to acid of Example 33 is to be taken or double this ratio with dibasic acid for making the carbamides or the same molar ratio with the dibasic acids for making the imides. With dibasic acids, such as phthalic acid, phthalic anhydride or the like, which have the acid groups in adjacent positions, the same or similar molar ratio of Example 33 can be used for the preparation of the imides. For this preparation urea, thiourea and the symmetrically substituted ureas are preferred. A high purity, as high as 99% pure and even purer, and a fine controllable particle size of crystalline material is obtainable by merely heating the acid and the urea or substituted urea, and the solvent with constant agitation while the solvent is boiling, then filtering, and drying. The resulting product is a uniform powder as there is hardly any tendency of the filtercake to fuse together during drying. This fusion tendency does not seem to take place in the absence of water.

For insect repellent compositions, the substituted ureas with alkylol chains of two carbons or more are very desirable, providing the hydroxyl group is not in the "1" positions as in methylolurea but is in the "2," "3," "4," "5," etc. position.

Further variations of the hydroxyalkyl carbamylcarboxylates and the hydroxyalkyl imidocarbonylcarboxylates made from tribasic acids, tetrabasic acids and other polybasic acids with more carboxylic acid groups can be made by the esterification of one or more of the carboxyl groups with an alkylol, such as methanol, ethanol, propanol, or the like.

Further variations are possible by the formation of bis-(carbamyl)carboxylates, tris-(carbamyl)carboxylates, or the like, with varying substitutions in the glycol or alkylol. Still further variations are possible by the formation of bis-(imidocarbonyl)carboxylates with the pentabasic and hexabasic organic acids or the preparation of polycarbanilides or polycarbonylimides.

When the polycarboxylic acid has the carboxylic acid groups in adjacent positions, the temperature during the preparation of the polycarbanilide is preferably kept below 130° C., as the higher temperatures foster the formation of imides. Even with these precautions, mixtures of polycarbanilide and imide will result, indicating that the formation of polycarbanilides is preferably done with polycarboxylic acids which have no adjacent carboxylic acid groups.

If the product desired is the imide, the polybasic acids preferred are those which have two carboxylic acid groups in adjacent positions. For its preparation, a small excess of urea is an advantage, whereas a large excess is a disadvantage requiring longer reaction time as some of carbanilide groups formed will have to be decomposed so that the imide can form. According to the disclosure of Example 33, for every carbanilide group to be formed, the ratio of carboxylic acid group to urea should be 2:1 with a preferred excess from 3 to 15% of urea. The molar ratio for the imide formation is 4 carboxylic acid groups for one mole of urea with a preferred excess from 2 to 10% of urea. Thus, one molecule of phthalic acid or phthalic anhydride would preferably be reacted with ½ molecule plus about 3% excess of urea so that a high yield of about 99% phthalimide and close to 100% purity would be obtained while heating the reagents with chlortoluene to about 165° C.

In the preparation of hydroxyalkyl polycarboxylates, many variations are possible due to substitutions of the hydroxy radical in the carboxyl group, which is essentially an acylhydroxide radical. Since polycarboxylic acids can be considered as poly-(acylhydroxides), the derivatives can be called derivatives of poly-acyl compounds, such as, if a carboxyl group is esterified with an alkylol, the compound can be considered as an acylalkoxide, or if the hydroxy radical is substituted by an amido radical, the compound can be considered as acylamide.

Additional variations are possible by using in the esterification of the poly-acyl compounds, such as the group consisting of acylhydroxides and acylalkoxides, glycols with substitution radicals for one or more hydrogens. Such glycols comprise the glycerol mono-ethers, which can be considered as alkoxypropylene glycols or alkoxypropanediols, the butanetriol monoethers, which can be considered alkoxybutylene glycols or alkoxybutanediols, or the vinylglycols, which can be considered as vinylalkanediols. These dihydric alcohols behave like the glycols during the esterification with the poly-acyl compounds.

The many possible variations show that this invention should not be limited to the cited examples but it should be defined by the following claims.

What is claimed is:

1. A method of preparation of a hydroxyalkyl carboxylate comprising esterifying an alkanediol and a polyacyl compound, selected from the group consisting of polycarboxylic acids, polycarboxylic acid anhydrides, and polyalkyl polycarboxylates, wherein the acid radical of said polyacyl compound is selected from the group consisting of acyclic and carbocyclic acid radicals by heating same in the presence of a volatile inert solvent amounting from 40 to 80% of the charge so that the temperature remains below 160° C. during the esterification, the alkanediol being present in an amount in excess of one mol for each acyl group.

2. A method of preparation of a hydroxyalkyl carboxylate comprising boiling a polycarboxylic acid selected from the group consisting of acyclic acids and carbocyclic acids with acyclic glycol in the presence of an inert solvent amounting from 40 to 80% of the charge so that the temperature remains below 160° C. and removing the liberated water during the esterification, the glycol being present in an amount in excess of one mol for each acyl group.

3. A method of preparation of a hydroxyalkyl carboxylate comprising boiling a polyacyl compound, selected from the group consisting of polycarboxylic acids, polycarboxylic acid anhydrides, and polyalkyl polycarboxylates wherein the acid radical of said polyacyl compound is selected from the group consisting of acyclic and carbocyclic acid radicals with an excess of the required amount of an alkanediol ranging from 25 to 300%, in the presence of a volatile inert solvent amounting from 40 to 80% of the charge so that the temperature during the esterification remains below 160° C., the required amount of alkanediol being about one mol for each carboxylic group of the acid.

4. A method of preparation of a hydroxyalkyl carboxylate comprising boiling a polycarboxylic acid selected from the group consisting of acyclic acids and carbocyclic acids with an excess of the required amount of an alkanediol ranging from 25 to 300% in the presence of an inert solvent amounting from 40 to 80% of the charge so that the temperature remains below 160° C. and removing the liberated water by physical separation during the esterification, the required amount of alkanediol being about one mol for each carboxylic group of the acid.

5. A method of preparation of a hydroxyalkyl carboxylate comprising boiling an anhydride of a polycarboxylic acid selected from the group consisting of acyclic and carbocyclic acids with an excess of the required amount of an alkanediol ranging from 25 to 300% in the presence of an inert solvent amounting from 40 to 80% of the charge so that the temperature remains below 160° C. and removing the liberated water by physical separation during the esterification, the required amount of alkanediol being about one mol for each carboxylic group of the acid.

6. A method of preparation of a hydroxyalkyl carboxylate comprising boiling a polyalkyl polycarboxylate selected from the group consisting of acyclic and carbocyclic carboxylates with an excess of the required amount of an alkanediol ranging from 25 to 300% in the presence of an inert solvent amounting from 40 to 80% of charge so that the temperature remains below 160° C., the required amount of alkanediol being about one mol for each carboxylic group of the acid.

7. A method of preparation of a mixed hydroxyalkyl carbamylcarboxylate comprising boiling an anhydride of a polycarboxylic acid selected from the group consisting of acyclic acids and carbocyclic acids with an alkanediol at about 100° C. and then further reacting the resulting acid hydroxyalkyl carboxylate with an amine selected from the group consisting of lower alkyl primary amines, lower alkyl secondary amines, cyclohexyl amine and dicyclohexyl amine in the presence of an inert solvent amounting from 40 to 80% of the charge so that the temperature remains below 160° C. and removing the liberated water by azeotropic distillation.

8. A method of preparation of a hydroxyalkyl carboxylate comprising boiling an anhydride of a polycarboxylic acid selected from the group consisting of acyclic acids and carbocyclic acids with an alkanediol at about 100° C. and then further reacting the resulting acid hydroxyalkyl carboxylate with a large excess of an alkylol below 160° C., said alkanediol being present in relatively small excess of one mol for each acyl group of the acid of the anhydride.

9. A method of preparation of a mixed hydroxyalkyl carbamylcarboxylate comprising boiling an amine selected from the group consisting of lower alkyl primary amines, lower alkyl secondary amines, cyclohexyl amine and dicyclohexyl amine and a polycarboxylic acid selected from the group consisting of acyclic acids and carbocyclic acids in the presence of an inert solvent and removing the liberated water by physical separation during the formation of the acid carbamyl compound below 230° C. and then further reacting the resulting carbamylcarboxylic acid with an excess of the required amount of an alkanediol ranging from 25 to 300% excess in the presence of an inert solvent amounting from 40 to 80% of the charge so that the temperature remains below 160° C. and removing the water during the esterification, the required amount of alkanediol being about one mol for each free carboxylic acid group of the carbamylcarboxylic acid.

10. A method of preparation of an alkyl hydroxyalkyl polycarboxylate comprising boiling a polyalkyl polycarboxylate selected from the group consisting of acyclic and carbocyclic carboxylates and at least one mol of an alkanediol for each carboxylate group in the presence of an inert solvent so that the temperature remains below 160° C. and boiling off the proportionate amount of liberated alkylol during the formation of the alkyl hydroxyalkyl polycarboxylate.

11. A method of preparation of a hydroxyalkyl carbamylcarboxylate comprising boiling a urea, selected from the group consisting of urea, thiourea, a symmetrical alkyl urea and a symmetrical alkyl thiourea, with a polycarboxylic acid selected from the group consisting of acyclic and carbocyclic acids in the presence of an inert solvent below 230° C. and then further reacting the resulting carbamylcarboxylic acid with an excess of the required amount of an alkanediol ranging from 25 to 300% in the presence of an inert solvent amounting from 40 to 80% of the charge so that the temperature remains below 160° C. and removing the liberated water by separation during the esterification, the required amount of alkanediol being about one mol for each carboxylic acid group of the carbamylcarboxylic acid.

12. A method of preparation of an imide of a hydroxyalkyl carboxylate comprising boiling a nitrogen-containing compound, selected from the group consisting of primary amines, urea, and symmetrical alkyl ureas, with a polyacyl compound, selected from the group consisting of polybasic acids with more than two carboxylic acid groups and their anhydrides which are characterized by having two adjacent acyl groups wherein the acid radical of said polyacyl compound is selected from the group consisting of acyclic and carbocyclic acid radicals, in the presence of an inert solvent, removing the water by separation during the formation of the acid imide, and then further reacting the resulting acid imide with an excess of the required amount of an alkanediol ranging from 25 to 300% in the presence of an inert solvent amounting from 40 to 80% of the charge so that the temperature remains below 160° C. and removing the liberated water by physical separation during the esterification, the required amount of alkanediol being about one mol for each free carboxylic group of the acid imide.

13. A method of preparation of an imide of a polycarboxylic acid comprising boiling a urea, selected from the group consisting of urea and symmetrical alkyl ureas, with a polyacyl compound, selected from the group consisting of polycarboxylic acids and their anhydrides having adjacent acyl groups wherein the acid radical of said polyacyl compound is selected from the group consisting of acyclic and carbocyclic acid radicals, in the presence of an inert solvent which limits the temperature to below 230° C. and permits the removal of liberated water by physical separation during the imide formation.

14. A method of preparation of bis (2-ethyl-3-hydroxyhexyl) phthalate comprising reacting 450 parts of 2-ethylhexanediol-1,3 with about 148 parts of phthalic anhydride in the presence of a volatile inert solvent amounting to about from 40 to 80 percent of the change, so that the temperature remains below 160° during the esterification.

References Cited in the file of this patent

UNITED STATES PATENTS

| | | |
|---|---|---|
| Re. 23,304 | O'Neal | Dec. 12, 1950 |
| 2,023,485 | Malm et al. | Dec. 10, 1935 |
| 2,048,778 | Brubaker et al. | July 28, 1936 |
| 2,073,031 | Sey | Mar. 9, 1937 |
| 2,166,119 | Bousquet | July 18, 1939 |
| 2,606,915 | Garbo | Aug. 12, 1952 |
| 2,624,753 | Emerson et al. | Jan. 6, 1953 |
| 2,624,754 | Blake | Jan. 6, 1953 |

OTHER REFERENCES

"Organic Chemistry," Paul Karrer-Elsevier Publishing Co., Inc., New York, 2nd English edition (1946), page 210.